(12) United States Patent
Dong et al.

(10) Patent No.: US 10,652,395 B2
(45) Date of Patent: May 12, 2020

(54) METHODS, APPARATUSES AND SYSTEM FOR SYNCHRONIZING CALL MEDIA AND CONTENT

(71) Applicant: ZTE Corporation, Shenzhen (CN)

(72) Inventors: Hao Dong, Shenzhen (CN); Ping Lu, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 291 days.

(21) Appl. No.: 15/528,563

(22) PCT Filed: Aug. 14, 2015

(86) PCT No.: PCT/CN2015/087082
§ 371 (c)(1),
(2) Date: May 22, 2017

(87) PCT Pub. No.: WO2016/078451
PCT Pub. Date: May 26, 2016

(65) Prior Publication Data
US 2017/0272577 A1    Sep. 21, 2017

(30) Foreign Application Priority Data
Nov. 20, 2014    (CN) .......................... 2014 1 0667210

(51) Int. Cl.
*H04M 3/50*    (2006.01)
*H04M 3/54*    (2006.01)
(Continued)

(52) U.S. Cl.
CPC ............ *H04M 3/54* (2013.01); *G06F 16/182* (2019.01); *H04L 29/08* (2013.01);
(Continued)

(58) Field of Classification Search
None
See application file for complete search history.

(56) References Cited

U.S. PATENT DOCUMENTS 8,600,018 B2 * 12/2013 Gao .................. G06F 3/016
                                                    235/462.01
9,154,622 B2 * 10/2015 Li ...................... H04M 3/493
(Continued)

FOREIGN PATENT DOCUMENTS

CN        101072399 A    11/2007
CN        101170727 A     4/2008
(Continued)

OTHER PUBLICATIONS

International Search Report for corresponding application PCT/CN2015/087082 filed Aug. 14, 2015; dated Oct. 21, 2015.
(Continued)

*Primary Examiner* — Quoc D Tran
(74) *Attorney, Agent, or Firm* — Cantor Colburn LLP

(57) ABSTRACT

Provided are methods, apparatuses and a system for synchronizing call media and content. In a process of playing call media to a user and displaying content associated with the call media, a terminal acquires new call media from a call media server and acquires, after querying a synchronization server for content information corresponding to the new call media, content associated with the new call media from a content server, respectively, in response to a user operation. The terminal plays the new call media to the user, and displays the content associated with the new call media simultaneously.

7 Claims, 7 Drawing Sheets

(51) Int. Cl.
*G06F 16/182* (2019.01)
*H04L 29/08* (2006.01)
*H04L 29/06* (2006.01)
*H04M 3/51* (2006.01)
*H04M 19/04* (2006.01)
*H04M 3/523* (2006.01)
*H04M 7/00* (2006.01)
*H04W 88/02* (2009.01)
*H04M 7/12* (2006.01)

(52) U.S. Cl.
CPC ...... *H04L 65/1089* (2013.01); *H04M 3/5166* (2013.01); *H04M 3/5183* (2013.01); *H04M 3/5232* (2013.01); *H04M 7/0015* (2013.01); *H04M 19/04* (2013.01); *H04W 88/027* (2013.01); *H04L 65/4007* (2013.01); *H04M 7/1295* (2013.01); *H04M 2201/22* (2013.01); *H04M 2207/18* (2013.01); *H04M 2207/206* (2013.01)

(56) References Cited

U.S. PATENT DOCUMENTS

| | | | |
|---|---|---|---|
| 9,912,809 B2* | 3/2018 | Pattan | H04L 65/1069 |
| 2006/0285662 A1* | 12/2006 | Yin | H04M 3/42382 |
| | | | 379/88.16 |
| 2009/0161842 A1 | 6/2009 | Sylvain | |
| 2014/0254437 A1* | 9/2014 | Koch | H04M 7/0027 |
| | | | 370/259 |
| 2017/0330557 A1* | 11/2017 | Pattan | G06F 3/04817 |

FOREIGN PATENT DOCUMENTS

| | | |
|---|---|---|
| CN | 101345747 A | 1/2009 |
| CN | 102196104 A | 9/2011 |
| EP | 0869688 A2 | 10/1998 |

OTHER PUBLICATIONS

European Search Report for corresponding application EP15861535; dated Jan. 25, 2018.

* cited by examiner

METHODS, APPARATUSES AND SYSTEM FOR SYNCHRONIZING CALL MEDIA AND CONTENT

TECHNICAL FIELD

The present disclosure relates to the field of communications, and more particularly to methods, apparatuses and a system for synchronizing call media and content.

BACKGROUND

In a related communication technology, under the scenario of concurrence of call media and content, a user can browse, while listening to or watching call media, content associated with the call media. For example, the user can browse social network information of the opposite party on a terminal screen in the calling process between two parties; or the user can browse an illustrated multimedia content associated with call media in the voice access process to a call center.

Under some scenarios, the user may control routes and progresses of the call media and the content. For example, during an Interactive Voice Response (IVR), the user may listen to voice menu information and presses a key to trigger display of a next menu. The user may browse the associated content, and may perform a mouse click operation to acquire and browse further detailed information under a certain entry.

The call media and the content experienced by the user simultaneously are associated with each other, and have respective routes and progresses.

However, it is difficult to maintain synchronization between call media and content associated with the call media in a related communication technology.

SUMMARY

Some embodiments of the present disclosure provide methods, apparatuses and a system for synchronizing call media and content, which may at least solve the problem in a related communication technology on how to maintain synchronization between call media and content associated with the call media.

According to an embodiment of the present disclosure, a method for synchronizing call media and content is provided.

The method for synchronizing call media and content according to the embodiment of the present disclosure may include the following acts. In a process of playing call media to a user and displaying content associated with the call media, a terminal acquires new call media from a call media server and acquires, after querying a synchronization server for content information corresponding to the new call media, content associated with the new call media from a content server, respectively, in response to a user operation. The terminal plays the new call media to the user, and displays the content associated with the new call media simultaneously.

In an exemplary embodiment, the act that the terminal acquires the new call media from the call media server may include the following acts. The terminal initiates an instruction for triggering the new call media to the call media server in response to a call media switching operation of the user. The terminal receives the new call media transmitted, by the call media server, according to the instruction.

In an exemplary embodiment, the instruction may be sent through a Dual Tone Multi Frequency (DTMF) signal.

In an exemplary embodiment, the act that the terminal acquires, after querying the synchronization server for the content information corresponding to the new call media, the content associated with the new call media from the content server may include the following acts. The terminal queries a synchronization server for content information corresponding to the new call media, and in the embodiment, the synchronization server is arranged to store and provide a correspondence between call media and content associated with the call media. The terminal sends an instruction for acquiring the content associated with the new call media to the content server according to the content information returned by the synchronization server. The terminal receives the content that is associated with the new call media and returned by the content server according to the instruction.

In an exemplary embodiment, the instruction may be sent through a Hyper Text Transport Protocol (HTTP) request, or through a Session Initiation Protocol (SIP) request.

In an exemplary embodiment, the act that the terminal acquires, after querying the synchronization server for the content information corresponding to the new call media, the content associated with the new call media from the content server may include the following acts. The terminal queries a synchronization server for content information corresponding to the new call media, and in the embodiment, the synchronization server is arranged to store and provide a correspondence between call media and content associated with the call media. The terminal receives the content that is associated with the new call media and returned by the content server. In the embodiment, the content associated with the new call media is pushed by the content server upon reception of a notification, which is sent to the content server by the synchronization server after finding the content information and sending the content information to the content server.

In an exemplary embodiment, the call media or the new call media may include at least one of: voice call media and video call media.

In an exemplary embodiment, the content may include one or more selected from a group consisting of: a World Wide Web page, a text, a picture, an animation, a sound and a video.

In an exemplary embodiment, the terminal may be one of: a mobile terminal, a Personal Computer (PC), a notebook computer, a set top box or a smart TV.

In an exemplary embodiment, a call client arranged to acquire or play the new call media, a content client arranged to acquire or display the content associated with the new call media and a synchronization client arranged to acquire a correspondence between the new call media and the content associated with the new call media may be run in the terminal.

According to another embodiment of the present disclosure, another method for synchronizing call media and content is provided.

The method for synchronizing call media and content according to the embodiment of the present disclosure may include the following acts. In a process of playing call media to a user and displaying content associated with the call media, a terminal acquires a new content from a content server and acquires, after querying a synchronization server for call media information corresponding to the new content, call media associated with the new content from a call media server, respectively, in response to a user operation. The terminal displays the new content to the user, and plays the call media associated with the new content simultaneously.

In an exemplary embodiment, the act that the terminal acquires the new content from the content server may include the following acts. The terminal sends an instruction for acquiring the new content to the content server in response to a content switching operation of the user. The terminal receives the new content returned, by the content server, according to the instruction.

In an exemplary embodiment, the act that the terminal acquires, after querying the synchronization server for the call media information corresponding to the new content, the call media associated with the new content from the call media server may include the following acts. The terminal queries a synchronization server for call media information corresponding to the new content, and in the embodiment, the synchronization server is arranged to store and provide a correspondence between content and call media associated with the content. The terminal initiates an instruction for triggering the call media associated with the new content to the call media server according to the call media information returned by the synchronization server. The terminal receives the call media that is associated with the new content and transmitted by the call media server according to the instruction.

According to a further embodiment of the present disclosure, an apparatus for synchronizing call media and content is provided.

The apparatus for synchronizing call media and content according to the embodiment of the present disclosure may include:

a call module, arranged to acquire, in a process of playing call media to a user, new call media from a call media server in response to a user operation;

a synchronization module, arranged to query a synchronization server for content information corresponding to the new call media; and a content module, arranged to acquire, in a process of displaying content associated with the call media to the user, content associated with the new call media from a content server according to the content information acquired by the synchronization module.

In an exemplary embodiment, the call module may include:

an initiation unit, arranged to initiate an instruction for triggering the new call media to the call media server in response to a call media switching operation of the user;

a first receiving unit, arranged to receive the new call media transmitted, by the call media server, according to the instruction; and a playing unit, arranged to play the call media to the user and play the new call media to the user.

In an exemplary embodiment, the synchronization module may include:

a query unit, arranged to query the synchronization server for the content information corresponding to the new call media, where the synchronization server is arranged to store and provide a correspondence between call media and content associated with the call media; and an informing unit, arranged to inform the content module of the acquired content information.

In an exemplary embodiment, the content module may include:

a sending unit, arranged to send an instruction for acquiring the content associated with the new call media to the content server according to the content information informed by the synchronization module;

a second receiving unit, arranged to receive the content that is associated with the new call media and returned by the content server according to the instruction; and a displaying unit, arranged to display the content associated with the call media to the user and display the content associated with the new call media to the user.

According to a further embodiment of the present disclosure, another apparatus for synchronizing call media and content is provided.

The apparatus for synchronizing call media and content according to the embodiment of the present disclosure may include:

a content module, arranged to acquire, in a process of displaying content to a user, a new content from a content server in response to a user operation;

a synchronization module, arranged to query a synchronization server for call media information corresponding to the new content; and a call module, arranged to acquire, in a process of playing call media associated with the content to the user, call media associated with the new content from a call media server according to the call media information acquired by the synchronization module.

In an exemplary embodiment, the content module may include:

a sending unit, arranged to send an instruction for acquiring the new content to the content server in response to a content switching operation of the user;

a first receiving unit, arranged to receive the new content returned, by the content server, according to the instruction; and a displaying unit, arranged to display the content to the user and display the new content to the user.

In an exemplary embodiment, the synchronization module may include:

a query unit, arranged to query the synchronization server for the call media information corresponding to the new content, where the synchronization server is arranged to store and provide a correspondence between content and call media associated with the content; and an informing unit, arranged to inform the call module of the acquired call media information.

In an exemplary embodiment, the call module may include:

an initiation unit, arranged to initiate an instruction for triggering the call media associated with the new content to the call media server according to the call media information informed by the synchronization module;

a second receiving unit, arranged to receive the call media that is associated with the new content and transmitted by the call media server according to the instruction; and a playing unit, arranged to play the call media associated with the content to the user and play the call media associated with the new content to the user.

According to a yet further embodiment of the present disclosure, a system for synchronizing call media and content is provided.

The system for synchronizing call media and content according to the embodiment of the present disclosure may include:

a call media server, arranged to provide call media for a terminal;

a content server, arranged to provide content for the terminal;

a synchronization server, arranged to store and provide a correspondence between the call media and the content; and the terminal, arranged to acquire the call media from the call media server and acquire the content associated with the call media from the content server according to the correspondence in response to a user operation, and play the call media to a user and display the content to the user synchronously; or arranged to acquire the content from the content server and acquire the call media associated with the content from the call media server according to the correspondence in response to a user operation, and display the content to the user and play the call media to the user synchronously.

In an exemplary embodiment, a call client arranged to acquire or play the new call media, a content client arranged to acquire or display the content associated with the new call media and a synchronization client arranged to acquire a correspondence between the new call media and the content associated with the new call media may be run in the terminal.

In an exemplary embodiment, the synchronization server may include: a query function for the correspondence and a storage function for the correspondence, where the query function and the storage function may be run in an identical physical server or run in two different physical servers respectively.

The following technical solution is provided by the embodiments of the present disclosure. In a process of playing call media to a user and displaying content associated with the call media, a terminal acquires new call media from a call media server and acquires, after querying a synchronization server for content information corresponding to the new call media, content associated with the new call media from a content server, respectively, in response to a user operation. The terminal plays the new call media to the user, and displays the content associated with the new call media simultaneously. The problem in a related communication technology on how to maintain synchronization between call media and content associated with the call media is solved, thus implementing playing of call media and displaying of a corresponding content synchronously.

BRIEF DESCRIPTION OF THE DRAWINGS

The drawings described herein are adopted to provide further understanding of the present disclosure, and form a part of the present application. The schematic embodiments and description of the present disclosure are adopted to explain the present disclosure, and do not form limits to the present disclosure. In the drawings.

DETAILED DESCRIPTION OF THE EMBODIMENTS

The present disclosure will be described hereinbelow with reference to the drawings and in conjunction with embodiments in detail. It may be appreciated that embodiments in the present application and features in the embodiments may be combined under the condition of no conflicts.

Figure 1:
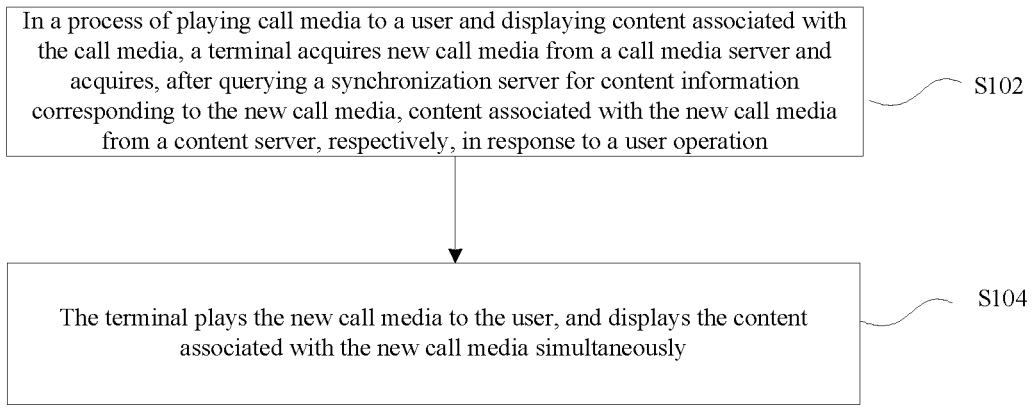
FIG. 1 is a flowchart of a method for synchronizing call media and content according to an embodiment of the present disclosure.

FIG. 1 is a flowchart of a method for synchronizing call media and content according to an embodiment of the present disclosure. As shown in FIG. 1, the method may include the processing acts S102 and S104 as follows.

At act S102, in a process of playing call media to a user and displaying content associated with the call media, a terminal acquires new call media from a call media server and acquires, after querying a synchronization server for content information corresponding to the new call media, content associated with the new call media from a content server, respectively, in response to a user operation.

At act S104, the terminal plays the new call media to the user, and displays the content associated with the new call media simultaneously.

When accessing a call center to subscribe for a specific commodity or select a specific service, the user not only receives voice call media, but also can browse multimedia content introductions about the commodity or the service acquired from a server. In the embodiment, the multimedia content may include one or more selected from a group consisting of a Web page, a text, a picture, an animation, a sound and a video. The call media received by the user usually adopts a form of a voice menu, and a key operation may be executed according to voice prompts and a user selection may be fed back. The user may select a browsed content by clicking or inputting. The abovementioned voice menu is associated with the content, and the content currently browsed by the user and the received voice are suggested to maintain synchronization. It is suggested to transfer corresponding information between the call media server for providing the call media and the content server for providing the content. By means of the method as shown in FIG. 1, the new call media is acquired from the call media server and the content associated with the new call media is acquired from the content server respectively in response to a user operation, the acquired new call media is played to the user, and the content associated with the new call media is displayed simultaneously. Thus, the problem in a related communication technology on how to maintain synchronization between call media and content associated with the call media is solved, thus implementing playing of call media and displaying of a corresponding content synchronously.

In an exemplary implementation process, the abovementioned terminal may be a mobile terminal such as a smart phone and a pad, a PC, a notebook computer, a set top box or a smart TV.

The abovementioned call may be voice call media or video call media.

The abovementioned content may be one or more selected from a group consisting of a Web page, a text, a picture, an animation, a sound and a video.

In an exemplary implementation process, a call client arranged to acquire or play the new call media, a content client arranged to acquire or display the content associated with the new call media and a synchronization client arranged to acquire a correspondence between the new call media and the content associated with the new call media are run in the terminal.

In an exemplary embodiment, in S102, the act that the terminal acquires the new call media from the call media server may include the acts 51 and S2 as follows.

At act 51, the terminal initiates an instruction for triggering the new call media to the call media server in response to a call media switching operation of the user.

At act S2, the terminal receives the new call media transmitted, by the call media server, according to the instruction.

In an exemplary embodiment, the abovementioned call media triggering instruction may be sent through a DTMF signal. The content acquisition instruction may be sent through an HTTP request or an SIP request, or may be sent through other content requests such as a short message, an instant message and a mail.

In an exemplary embodiment, in S102, the act that the terminal acquires, after querying the synchronization server for the content information corresponding to the new call media, the content associated with the new call media from the content server may include the acts S3 to S5 as follows.

At act S3, the terminal queries a synchronization server for content information corresponding to the new call media. In the embodiment, the synchronization server is arranged to store and provide a correspondence between call media and content associated with the call media.

At act S4, the terminal sends an instruction for acquiring the content associated with the new call media to the content server according to the content information returned by the synchronization server.

At act S5, the terminal receives the content that is associated with the new call media and returned by the content server according to the instruction.

The abovementioned corresponding information for synchronizing the call media and the content may be stored in a database in a form of a mapping table, or stored in an Extensive Markup Language (XML) file.

In an exemplary embodiment, in S102, the act that the terminal acquires, after querying the synchronization server for the content information corresponding to the new call media, the content associated with the new call media from the content server may include the acts S6 and S7 as follows.

At act S6, the terminal queries a synchronization server for content information corresponding to the new call media.

In the embodiment, the synchronization server is arranged to store and provide a correspondence between call media and content associated with the call media.

At act S7, the terminal receives the content that is associated with the new call media and returned by the content server. In the embodiment, the content associated with the new call media may be pushed by the content server upon reception of a notification, which is sent to the content server by the synchronization server after finding the content information and sending the content information to the content server.

In an exemplary embodiment, the abovementioned content information may be a Web Uniform Resource Locator (URL) or Uniform Resource Identifier (URI). For example, when the content is a Web page, the synchronization server will return the Web URL or URI to the terminal at this time, and the terminal acquires the Web page. Or, the synchronization server may inform the content server (Web server) to directly push the Web page corresponding to the Web URL or URI to the terminal.

The abovementioned content pushing may be based on some general protocols and methods in the industry such as a Websocket, an HTTP-based long poll or HTTP stream, an SIP message and service information (WAP Push), or a content pushing mechanism implemented by a service provider directly based on a Transport Control Protocol (TCP) or User Datagram Protocol (UDP).

Figure 2:
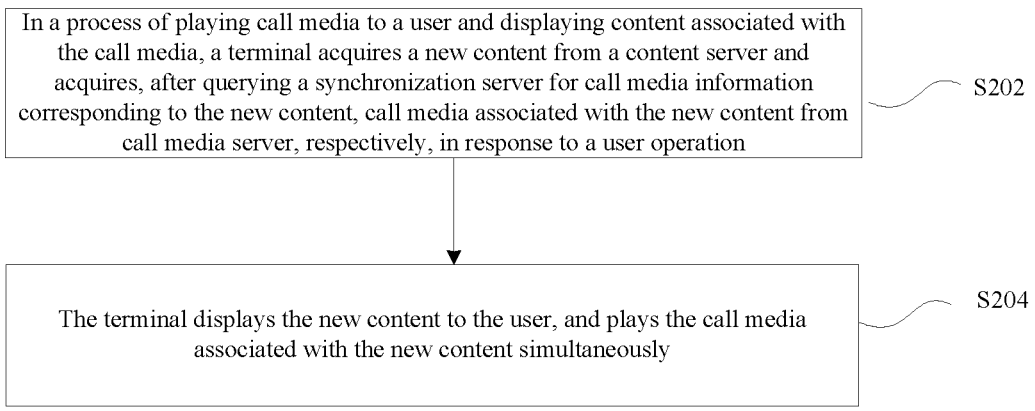
FIG. 2 is a flowchart of another method for synchronizing call media and content according to an embodiment of the present disclosure.

FIG. 2 is a flowchart of another method for synchronizing call media and content according to an embodiment of the present disclosure. As shown in FIG. 2, the method may include the processing acts as follows.

At act S202, in a process of playing call media to a user and displaying content associated with the call media, a terminal acquires a new content from a content server and acquires, after querying a synchronization server for call media information corresponding to the new content, call media associated with the new content from a call media server, respectively, in response to a user operation.

At act S204, the terminal displays the new content to the user, and plays the call media associated with the new content simultaneously.

In an exemplary embodiment, in S202, the act that the terminal acquires the new content from the content server may include the acts S8 and S9 as follows.

At act S8, the terminal sends an instruction for acquiring the new content to the content server in response to a content switching operation of the user.

At act S9, the terminal receives the new content returned, by the content server, according to the instruction.

In an exemplary embodiment, in S202, the act that the terminal acquires, after querying the synchronization server for the call media information corresponding to the new content, the call media associated with the new content from the call media server may include the acts S10 to S12 as follows.

At act S10, the terminal queries a synchronization server for call media information corresponding to the new content, and in the embodiment, the synchronization server is arranged to store and provide a correspondence between content and call media associated with the content.

At act S11, the terminal initiates an instruction for triggering the call media associated with the new content to the call media server according to the call media information returned by the synchronization server.

At act S12, the terminal receives the call media that is associated with the new content and transmitted by the call media server according to the instruction.

The abovementioned exemplary implementation process will be further described hereinbelow with the following three exemplary implementation modes.

First Exemplary Embodiment

Figure 3:
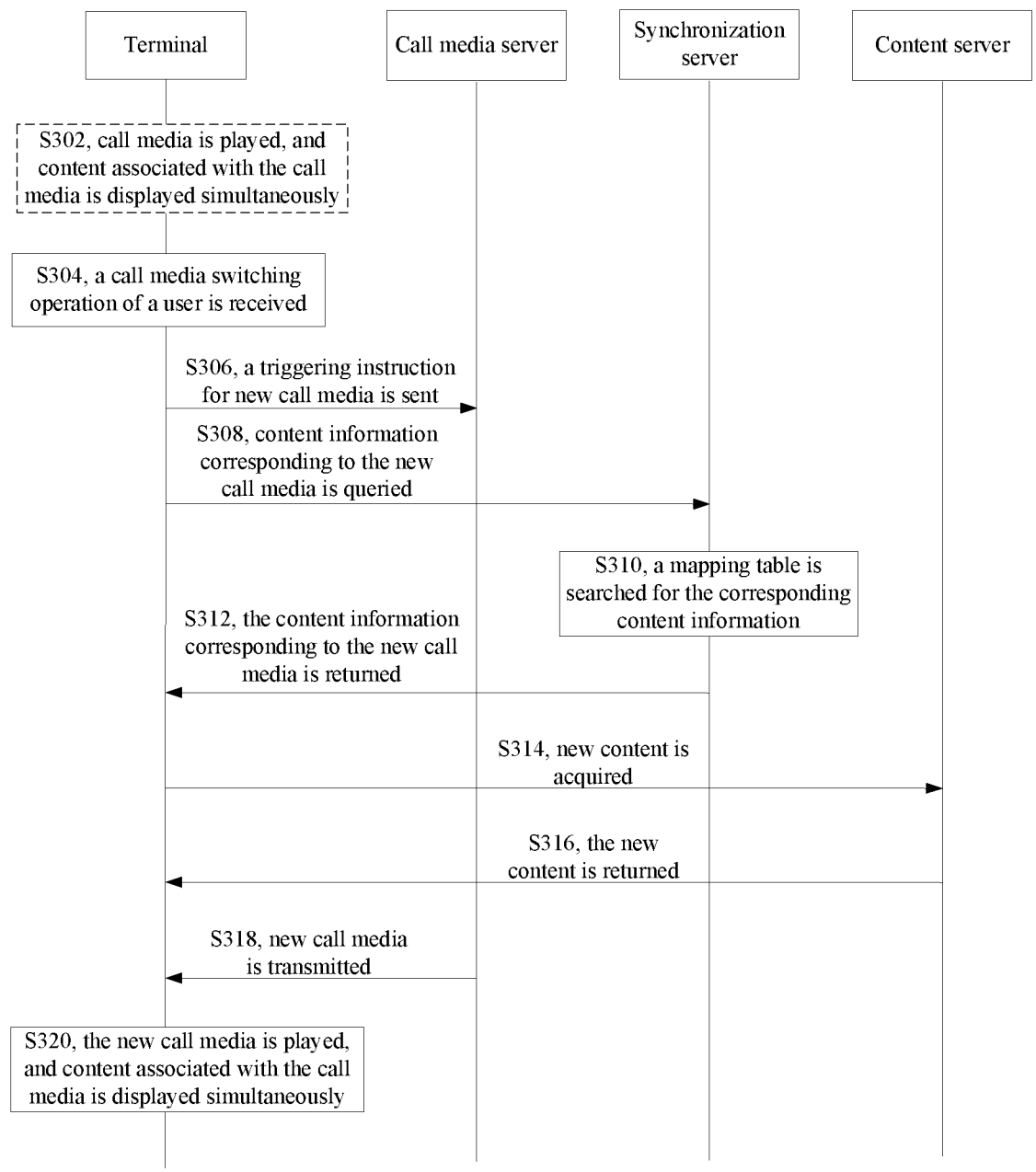
FIG. 3 is a flowchart of a method for synchronizing call media and content where call media switching is triggered firstly according to an exemplary embodiment of the present disclosure.

FIG. 3 is a flowchart of a method for synchronizing call media and content where call media switching is triggered firstly according to an exemplary embodiment of the present disclosure. As shown in FIG. 3, the method may include the processing acts S302 to S320 as follows.

At act S302, a terminal plays current call media to a user and displays content associated with the call media simultaneously.

At act S304, the terminal receives a call media switching operation of the user.

At act S306, the terminal sends a triggering instruction for new call media to a call media server.

At act S308, the terminal queries a synchronization server for content information corresponding to the new call media, simultaneously.

At act S310, the synchronization server searches a mapping table for the corresponding content information.

At act S312, the synchronization server returns the content information corresponding to the new call media to the terminal.

At act S314, the terminal initiates a request to a content server according to the content information to acquire a new content.

At act S316, the content server returns the new content to the terminal.

At act S318, the call media server transmits new call media to the terminal.

At act S320, the terminal plays the new call media and displays content associated with the call media simultaneously.

The exemplary embodiment is applicable to a scenario where a user makes a call to a call center of an insurance company and can browse instruction contents associated with an insurance product on a screen of a mobile phone or a PC. The user may hear a voice prompt: for automobile insurance, press 1, for property insurance, press 2, and for life insurance, press 3. The user can browse text and picture introductions of corresponding insurances on the screen. After the user presses 3, not only detailed voice introductions and classes (e.g., health insurance 1, accident insurance 2, endowment insurance 3, and travel insurance 4) about the life insurance are received, but also multimedia content introductions about the life insurance and subclasses are displayed on the screen to the user by means of the abovementioned synchronization acts in the exemplary embodiment. The user may listen, browse and make a further choice.

Second Exemplary Embodiment

Figure 4:
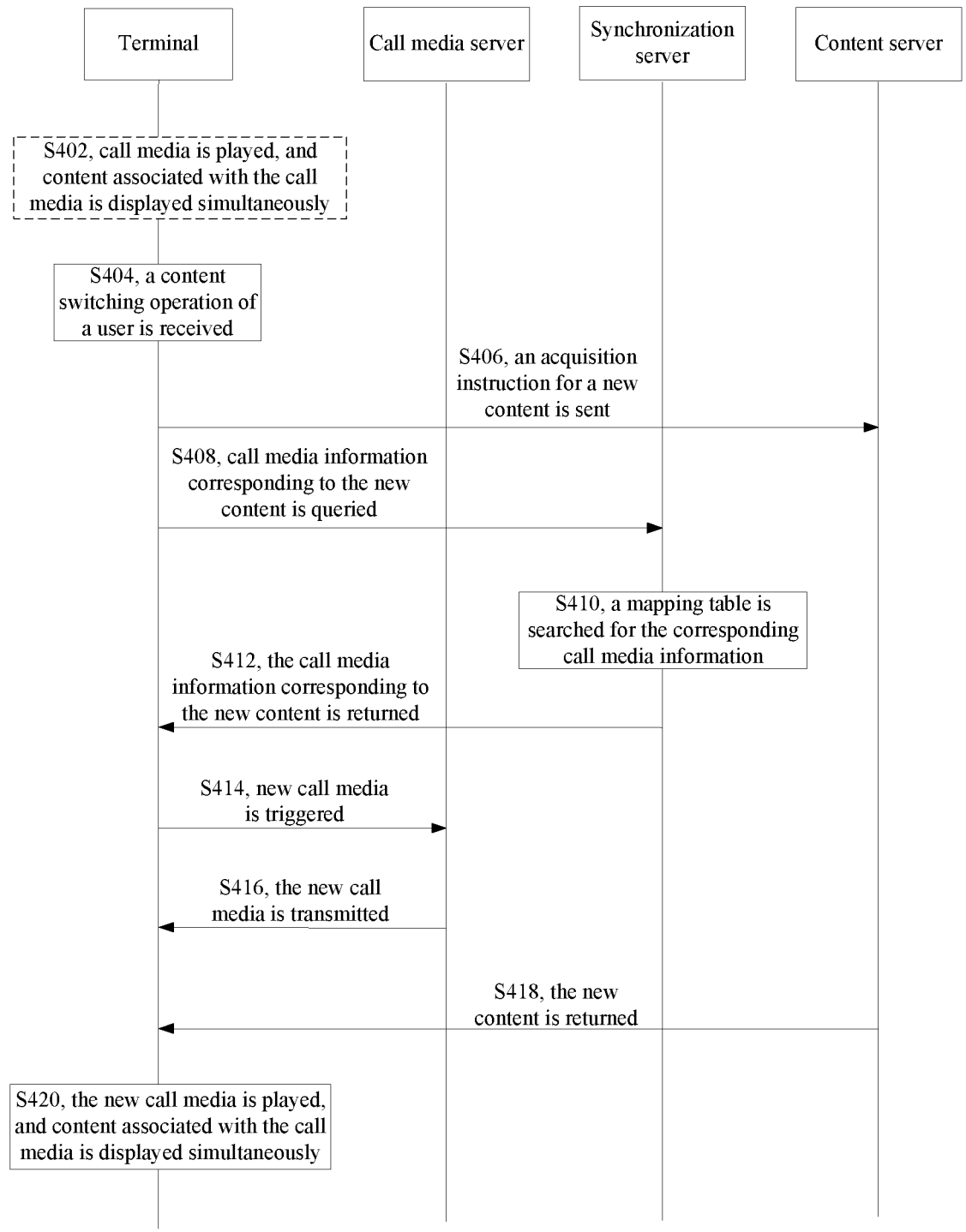
FIG. 4 is a flowchart of a method for synchronizing call media and content where content switching is triggered firstly according to an exemplary embodiment of the present disclosure.

FIG. 4 is a flowchart of a method for synchronizing call media and content where content switching is triggered firstly according to an exemplary embodiment of the present disclosure. As shown in FIG. 4, the method may include the processing acts S402 to S420 as follows.

At act S402, a terminal plays current call media to a user and displays content associated with the call media simultaneously.

At act S404, the terminal receives a content switching operation of the user.

At act S406, the terminal sends an acquisition instruction for a new content to a content server.

At act S408, the terminal queries a synchronization server for call media information corresponding to the new content, simultaneously.

At act S410, the synchronization server searches a mapping table for the corresponding call media information.

At act S412, the synchronization server returns the call media information corresponding to the new content to the terminal.

At act S414, the terminal initiates new call media triggering request to a call media server according to the call media information.

At act S416, the call media server transmits new call media to the terminal.

At act S418, the content server returns a new content to the terminal.

At act S420, the terminal plays the new call media and displays content associated with the call media simultaneously.

In the same scenario as the previous exemplary embodiment, a user makes a call to a call center of an insurance company and listens to and browses content associated with the call media. If a screen of a terminal used by the user is big enough, contents of a primary menu and a secondary menu may be displayed on the screen simultaneously when the user listens to a first stage of voice menu. For example, besides a first class including automobile insurance 1, property insurance 2 and life insurance 3, picture and text introductions about subclasses namely health insurance 1, accident insurance 2, endowment insurance 3 and travel insurance 4 in a submenu of the life insurance may also be displayed. Thus, when clicking the subclass accident insurance 2 on the screen, the user not only can browse detailed introductions on the screen, but also can play voice information corresponding to the accident insurance to a client through a call media server by means of the synchronization step provided in the exemplary embodiment. So, the user can directly skip to a needed subclass voice without needing to listen to all of voices in a first stage of menu.

Third Exemplary Embodiment

Figure 5:
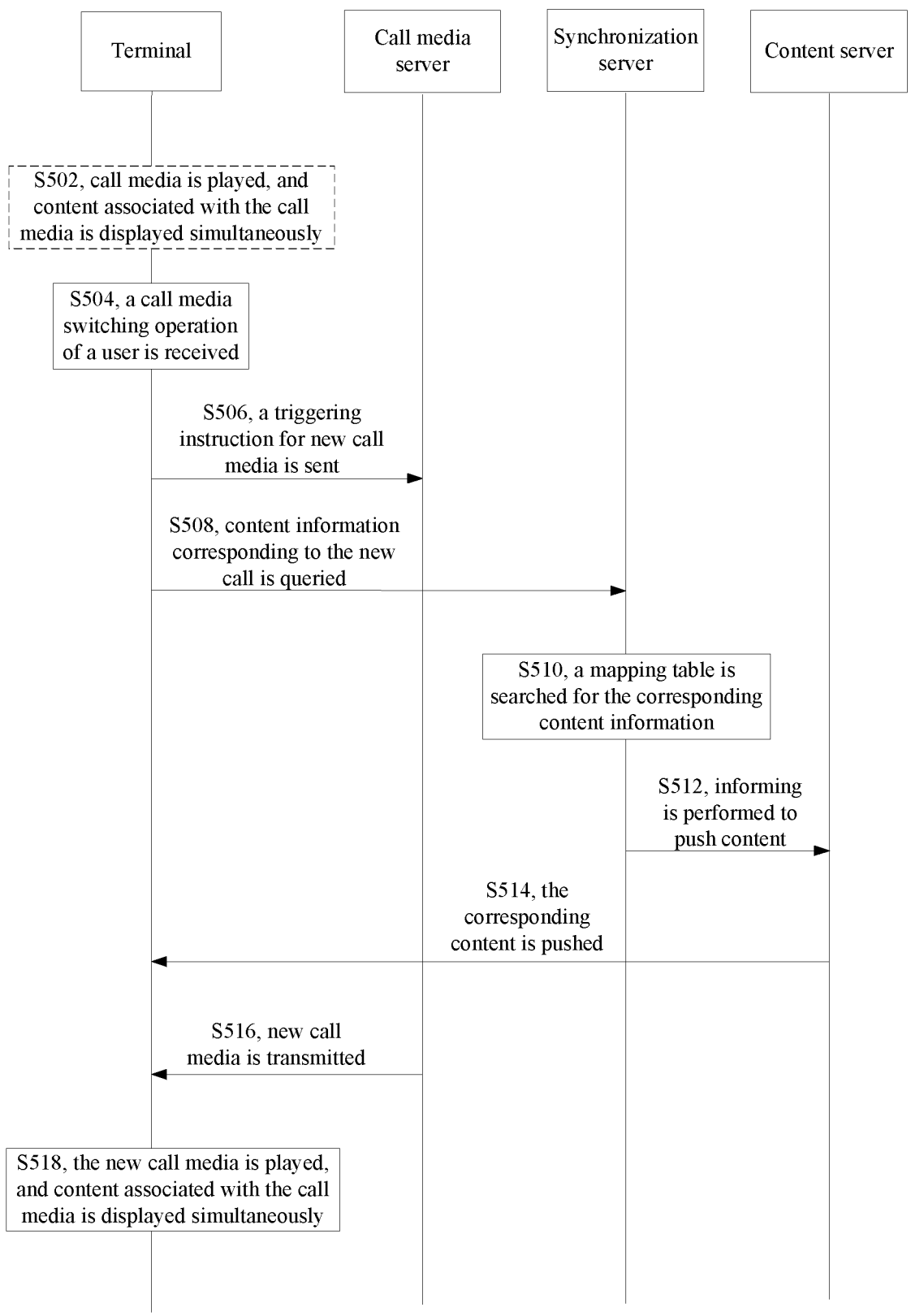
FIG. 5 is a flowchart of a push-based method for synchronizing call media and content according to an exemplary embodiment of the present disclosure.

FIG. 5 is a flowchart of a push-based method for synchronizing call media and content according to an exemplary embodiment of the present disclosure. As shown in FIG. 5, the method may include the processing acts S502 to S518 as follows.

At act S502, a terminal plays current call media to a user and displays content associated with the call media simultaneously.

At act S504, the terminal receives a call media switching operation of the user.

At act S506, the terminal sends a triggering instruction for new call media to a call media server.

At act S508, the terminal queries a synchronization server for content information corresponding to the new call media, simultaneously.

At act S510, the synchronization server searches a mapping table for the corresponding content information.

At act S512, the synchronization server sends the content information corresponding to the new call media to a content server, and informs the content server to push the corresponding content to the terminal.

At act S514, the content server pushes the corresponding content to the terminal.

At act S516, the call media server transmits new call media to the terminal.

At act S518, the terminal plays the new call media and displays content associated with the call media simultaneously.

Different from the abovementioned first exemplary embodiment, the synchronization server send the content information corresponding to the new call media to the content server, and informs the content server to push the corresponding content to the terminal.

In addition, also provided is a push-based method for synchronizing call media and content. In the method, a user executes a content switching operation firstly, a terminal queries a synchronization server, the synchronization server needs to send corresponding call media information to a call media server, and then the call media server directly plays corresponding call media to the terminal.

Figure 6:
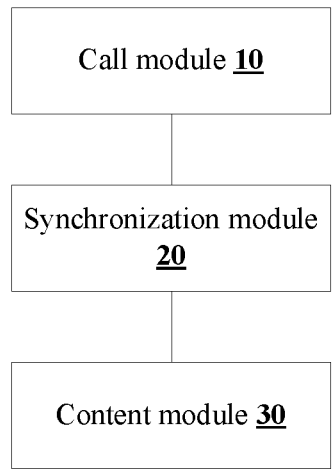
FIG. 6 is a structural diagram of an apparatus for synchronizing call media and content according to an embodiment of the present disclosure.

FIG. 6 is a structural diagram of an apparatus for synchronizing call media and content according to an embodiment of the present disclosure. As shown in FIG. 6, the apparatus for synchronizing call media and content may include: a call module 10, arranged to acquire, in a process of playing call media to a user, new call media from a call media server in response to a user operation; a synchronization module 20, arranged to query a synchronization server for content information corresponding to the new call media; and a content module 30, arranged to acquire, in a process of displaying content associated with the call media to the user, content associated with the new call media from a content server according to the content information acquired by the synchronization module.

By means of the apparatus as shown in FIG. 6, the problem in a related communication technology on how to maintain synchronization between call media and content associated with the call media is solved, thus implementing playing of call media and displaying of a corresponding content synchronously.

In an exemplary implementation process, the abovementioned terminal may be a mobile terminal such as a smart phone and a pad, a PC, a notebook computer, a set top box or a smart TV.

The abovementioned call media may be voice call media or video call media.

The abovementioned content may be one or more selected from a group consisting of a Web page, a text, a picture, an animation, a sound and a video.

In an exemplary implementation process, a call client arranged to acquire or play the new call media, a content client arranged to acquire or display the content associated with the new call media and a synchronization client arranged to acquire a correspondence between the new call media and the content associated with the new call media are run in the terminal.

Figure 7:
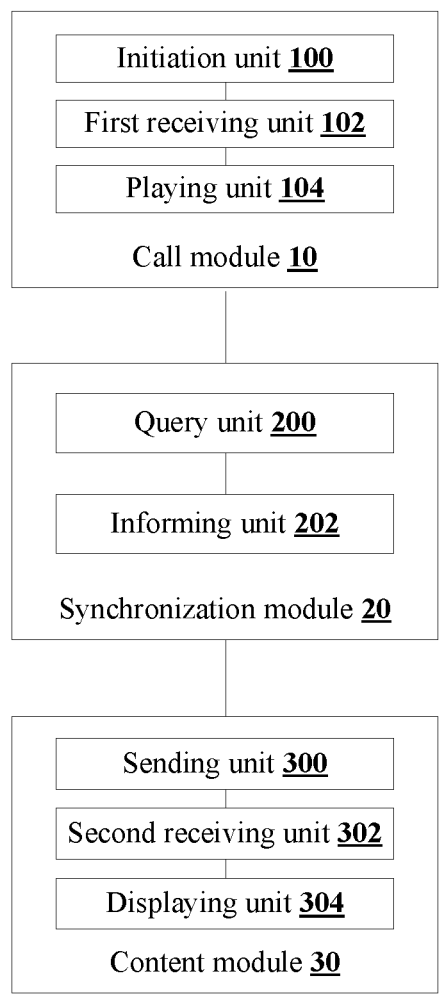
FIG. 7 is a structural diagram of an apparatus for synchronizing call media and content according to an exemplary embodiment of the present disclosure.

In an exemplary embodiment, as shown in FIG. 7, the call module 10 may include: an initiation unit 100, arranged to initiate an instruction for triggering the new call media to the call media server in response to a call media switching operation of the user; a first receiving unit 102, arranged to receive the new call media transmitted, by the call media server, according to the instruction; and a playing unit 104, arranged to play the call media to the user and play the new call media to the user.

In an exemplary embodiment, as shown in FIG. 7, the synchronization module 20 may include: a query unit 200, arranged to query the synchronization server for the content information corresponding to the new call media, and in the embodiment, the synchronization server is arranged to store and provide a correspondence between call media and content associated with the call media; and an informing unit 202, arranged to inform the content module of the acquired content information.

In an exemplary embodiment, as shown in FIG. 7, the content module 30 may include: a sending unit 300, arranged to send an instruction for acquiring the content associated with the new call media to the content server according to the content information informed by the synchronization module; a second receiving unit 302, arranged to receive the content that is associated with the new call media and returned by the content server according to the instruction; and a displaying unit 304, arranged to display the content associated with the call media to the user and display the content associated with the new call media to the user.

Figure 8:
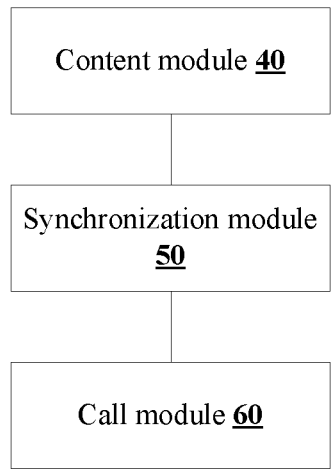
FIG. 8 is a structural diagram of another apparatus for synchronizing call media and content according to an embodiment of the present disclosure.

FIG. 8 is a structural diagram of another apparatus for synchronizing call media and content according to an embodiment of the present disclosure. As shown in FIG. 8, the apparatus for synchronizing call media and content may include: a content module 40, arranged to acquire a new content from a content server in response to a user operation in a process of displaying a content to a user; a synchronization module 50, arranged to query a synchronization server for call media information corresponding to the new content; and a call module 60, arranged to acquire, in a process of playing call media associated with the content to the user, call media associated with the new content from a call media server according to the call media information acquired by the synchronization module.

Figure 9:
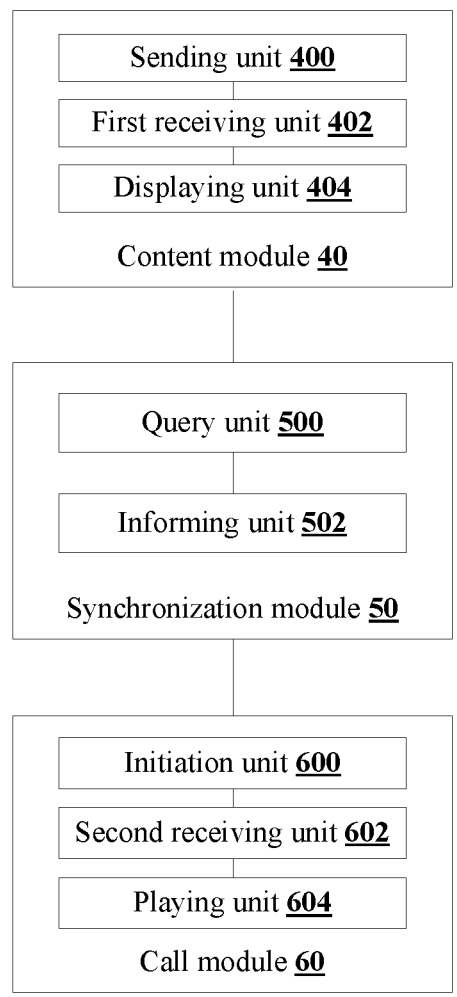
FIG. 9 is a structural diagram of another apparatus for synchronizing call media and content according to an exemplary embodiment of the present disclosure.

In an exemplary embodiment, as shown in FIG. 9, the content module 40 may include: a sending unit 400, arranged to send an instruction for acquiring the new content to the content server in response to a content switching operation of the user; a first receiving unit 402, arranged to receive the new content returned, by the content server, according to the instruction; and a displaying unit 404, arranged to display the content to the user and display the new content to the user.

In an exemplary embodiment, as shown in FIG. 9, the synchronization module 50 may include: a query unit 500, arranged to query the synchronization server for the call media information corresponding to the new content, and in the embodiment, the synchronization server is arranged to store and provide a correspondence between content and call media associated with the content; and an informing unit 502, arranged to inform the call module of the acquired call media information.

In an exemplary embodiment, as shown in FIG. 9, the call module 60 may include: an initiation unit 600, arranged to initiate an instruction for triggering the call media associated with the new content to the call media server according to the call media information informed by the synchronization module; a second receiving unit 602, arranged to receive the call media that is associated with the new content and transmitted by the call media server according to the instruction; and a playing unit 604, arranged to play the call media associated with the content to the user and play the call media associated with the new content to the user.

Figure 10:
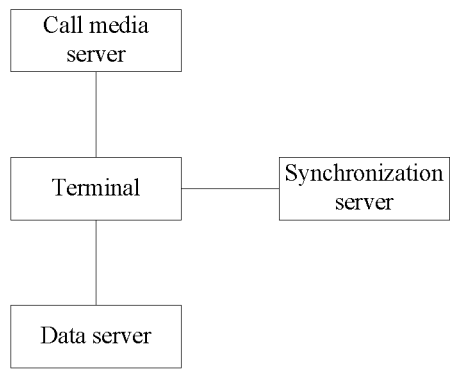
FIG. 10 is a structural diagram of a system for synchronizing call media and content according to an exemplary embodiment of the present disclosure.
Figure 11:
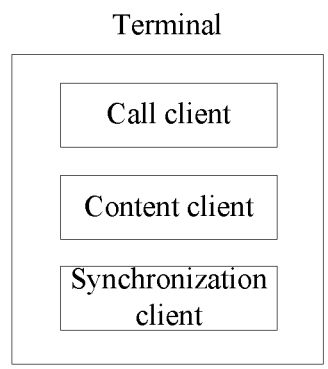
FIG. 11 is an internal structure diagram of a terminal according to an exemplary embodiment of the present disclosure.

FIG. 10 is a structural diagram of a system for synchronizing call media and content according to an exemplary embodiment of the present disclosure. As shown in FIG. 10, a terminal plays call media and displays content to a user, and receives new call media acquired by a user operation and a corresponding content. FIG. 11 is an internal structure diagram of a terminal according to an exemplary embodiment of the present disclosure. As shown in FIG. 11, the terminal may include: a call client, a content client and a synchronization client. In the embodiment, the call client interacts with a call media server to achieve a relevant function, the content client interacts with a content server to achieve a relevant function, and the synchronization client interacts with a synchronization server to achieve a relevant function.

The abovementioned system may further include: the call media server, responsible for providing call media for the terminal; the content server, responsible for providing content for the terminal; and the synchronization server, responsible for storing and providing corresponding information of the call media and the content.

Figure 12:
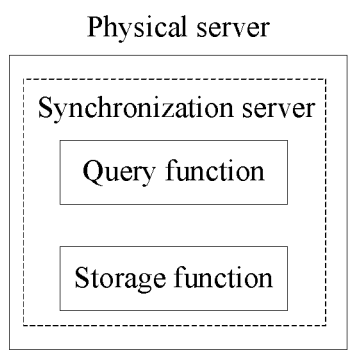
FIG. 12 is a diagram of a structure where a query function and storage function of a synchronization server are run in an identical physical server according to an exemplary embodiment of the present disclosure.
Figure 13:
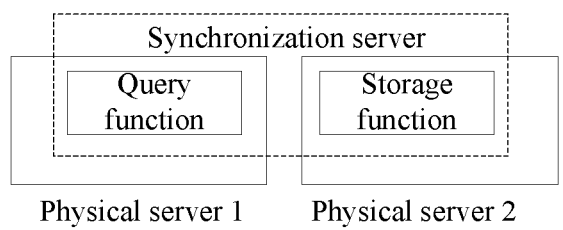
FIG. 13 is a diagram of a structure where a query function and storage function of a synchronization server are run in different physical servers according to an exemplary embodiment of the present disclosure.

FIG. 12 is a diagram of a structure where a query function and storage function of a synchronization server are run in an identical physical server according to an exemplary embodiment of the present disclosure. As shown in FIG. 12, the synchronization server may include: a query function for the correspondence and a storage function for the correspondence. The query function and the storage function may be run in an identical physical server. FIG. 13 is a diagram of a structure where a query function and storage function of a synchronization server are run in different physical servers according to an exemplary embodiment of the present disclosure. As shown in FIG. 13, the synchronization server similarly includes: a query function about corresponding information of content and call media, and a storage function for storing the corresponding information of the content and the call media. The query function and the storage function may be run in two different physical servers respectively.

From the above description, it can be seen that the abovementioned embodiments achieve the following technical effects (it may be appreciated that these effects are achievable effects of some exemplary embodiments). By means of the technical solution provided in the embodiments of the present disclosure, the terminal receives a user operation in a process of playing call media and displaying content, and by means of the corresponding information of the call media and the content, acquired from the synchronization server, playing of call media and displaying of a corresponding content can be carried out synchronously.

Obviously, a person skilled in the art shall understand that all of the abovementioned modules or acts in the embodiments of the present disclosure may be implemented by using a general calculation device, may be centralized on a single calculation device or may be distributed on a network composed of multiple calculation devices. Alternatively, they may be implemented by using executable program codes of the calculation devices. Thus, they may be stored in a storage device and executed by the calculation devices, the shown or described acts may be executed in a sequence different from this sequence under certain conditions, or they are manufactured into each integrated circuit module respectively, or multiple modules or acts therein are manufactured into a single integrated circuit module. Thus, the present disclosure is not limited to a combination of any specific hardware and software.

The above is only the exemplary embodiments of the present disclosure, and not intended to limit the present disclosure. As will occur to a person skilled in the art, the present disclosure is susceptible to various modifications and changes. Any modifications, equivalent replacements, improvements and the like made within the principle of the present disclosure shall fall within the scope of protection defined by the appended claims of the present disclosure.

INDUSTRIAL APPLICABILITY

As above, the methods, apparatuses and system for synchronizing call media and content provided in the embodiments of the present disclosure have the beneficial effects that playing of call media and displaying of a corresponding content synchronously can be implemented.

What is claimed is:

1. A method for synchronizing call media and content, comprising:
in a process of playing call media to a user and displaying content associated with the call media, acquiring, by a terminal, new call media from a call media server and acquiring, by the terminal after querying a synchronization server for content information corresponding to the new call media, content associated with the new call media from a content server, respectively, in response to a user operation; and
playing, by the terminal, the new call media to the user and displaying, by the terminal, the content associated with the new call media simultaneously;
wherein acquiring, by the terminal after querying the synchronization server for the content information corresponding to the new call media, the content associated with the new call media from the content server comprises:
querying, by the terminal, the synchronization server for the content information corresponding to the new call media, wherein the synchronization server is arranged to store and provide a correspondence between call media and content associated with the call media; sending, by the terminal, an instruction for acquiring the content associated with the new call media to the content server according to the content information returned by the synchronization server; and receiving, by the terminal, the content that is associated with the new call media and returned by the content server according to the instruction;
or,
querying, by the terminal, the synchronization server for the content information corresponding to the new call media, wherein the synchronization server is arranged to store and provide a correspondence between call media and content associated with the call media; and receiving, by the terminal, the content that is associated with the new call media and returned by the content server, wherein the content associated with the new call media is pushed by the content server upon reception of a notification, which is sent to the content server by the synchronization server after finding the content information and sending the content information to the content server.

2. The method as claimed in claim 1, wherein acquiring, by the terminal, the new call media from the call media server comprises:
initiating, by the terminal, an instruction for triggering the new call media to the call media server in response to a call media switching operation of the user; and
receiving, by the terminal, the new call media transmitted, by the call media server, according to the instruction.

3. The method as claimed in claim 2, wherein the instruction is sent through a Dual Tone Multi Frequency (DTMF) signal.

4. The method as claimed in claim 1, wherein the instruction is sent through a Hyper Text Transport Protocol (HTTP) request, or through a Session Initiation Protocol (SIP) request.

5. The method as claimed in claim 1, wherein
the call media or the new call media comprises at least one of: voice call media and video call media;
or, the content comprises one or more selected from a group consisting of: a World Wide Web page, a text, a picture, an animation, a sound and a video;

or, the terminal is one of: a mobile terminal, a Personal Computer (PC), a notebook computer, a set top box or a smart TV;

or, a call client arranged to acquire or play the new call media, a content client arranged to acquire or display the content associated with the new call media and a synchronization client arranged to acquire a correspondence between the new call media and the content associated with the new call media are run in the terminal.

6. An apparatus for synchronizing call media and content, comprising a hardware processor arranged to execute program modules comprising:

a call module, arranged to acquire, in a process of playing call media to a user, new call media from a call media server in response to a user operation;

a synchronization module, arranged to query a synchronization server for content information corresponding to the new call media; and a content module, arranged to acquire, in a process of displaying content associated with the call media to the user, content associated with the new call media from a content server according to the content information acquired by the synchronization module;

wherein the synchronization module comprises:

a query unit, arranged to query the synchronization server for the content information corresponding to the new call media, wherein the synchronization server is arranged to store and provide a correspondence between call media and content associated with the call media; and an informing unit, arranged to inform the content module of the acquired content information;

wherein the content module comprises:

a sending unit, arranged to send an instruction for acquiring the content associated with the new call media to the content server according to the content information informed by the synchronization module;

a second receiving unit, arranged to receive the content that is associated with the new call media and returned by the content server according to the instruction; and a displaying unit, arranged to display the content associated with the call media to the user and display the content associated with the new call media to the user.

7. The apparatus as claimed in claim 6, wherein the call module comprises:

an initiation unit, arranged to initiate an instruction for triggering the new call media to the call media server in response to a call media switching operation of the user;

a first receiving unit, arranged to receive the new call media transmitted, by the call media server, according to the instruction; and a playing unit, arranged to play the call media to the user and play the new call media to the user.

* * * * *